F. ENGEL.
MACHINE FOR FORMING STORAGE BATTERY PLATES.
APPLICATION FILED JUNE 17, 1909.

1,190,990.

Patented July 11, 1916.
5 SHEETS—SHEET 1.

Witnesses:

Inventor:
Frank Engel
By Ethan B. Hiower Jr
Atty

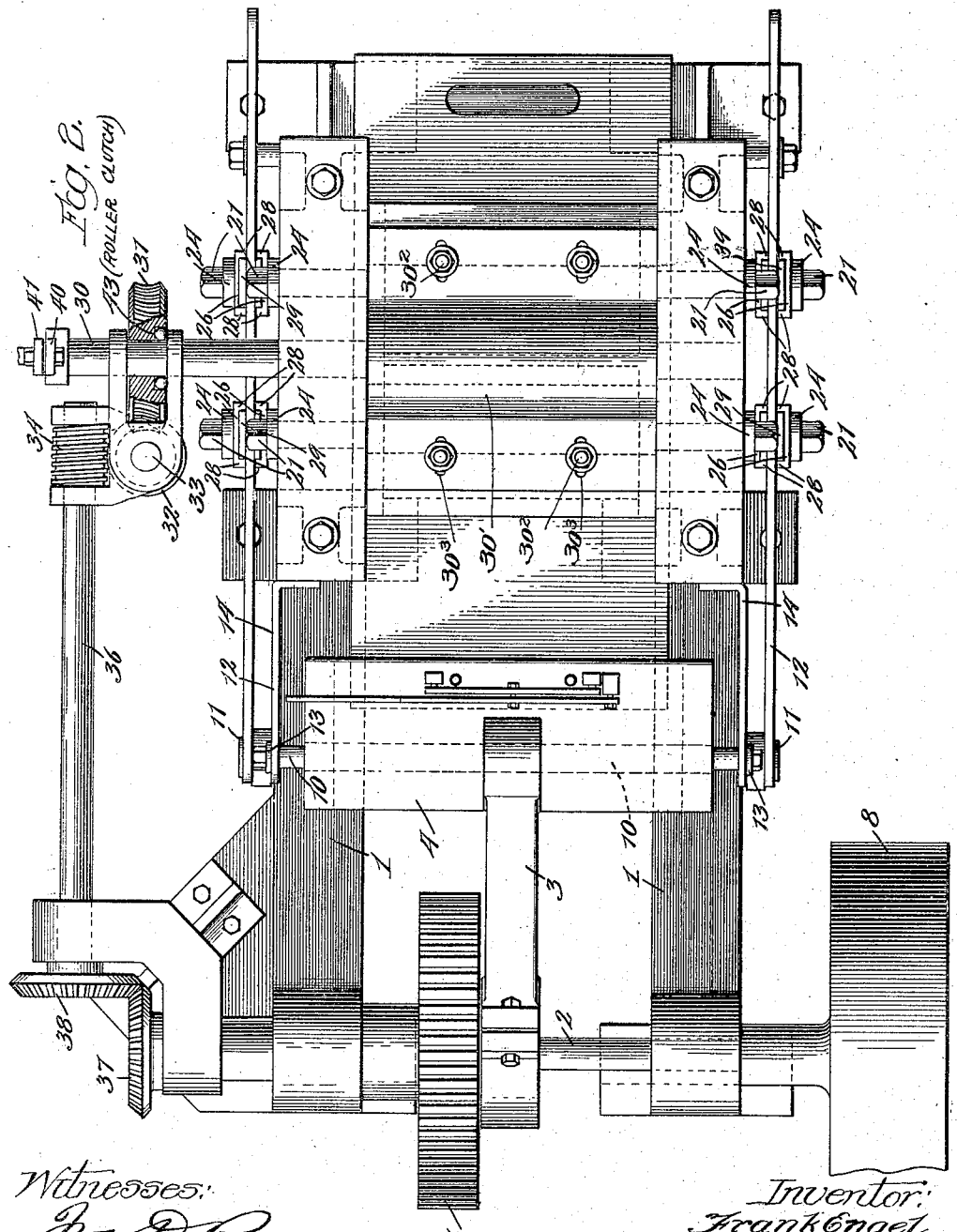

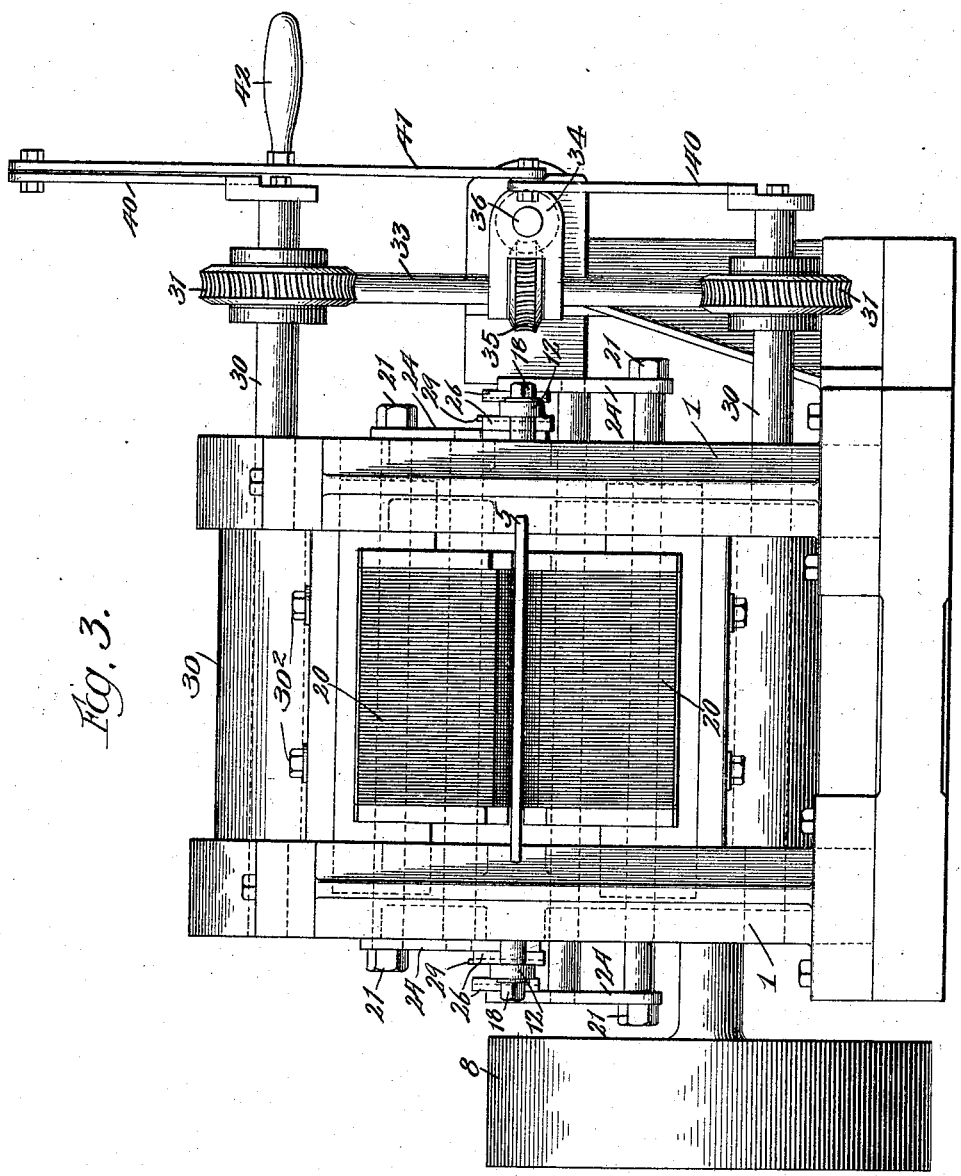

F. ENGEL.
MACHINE FOR FORMING STORAGE BATTERY PLATES.
APPLICATION FILED JUNE 17, 1909.
1,190,990.
Patented July 11, 1916.
5 SHEETS—SHEET 4.
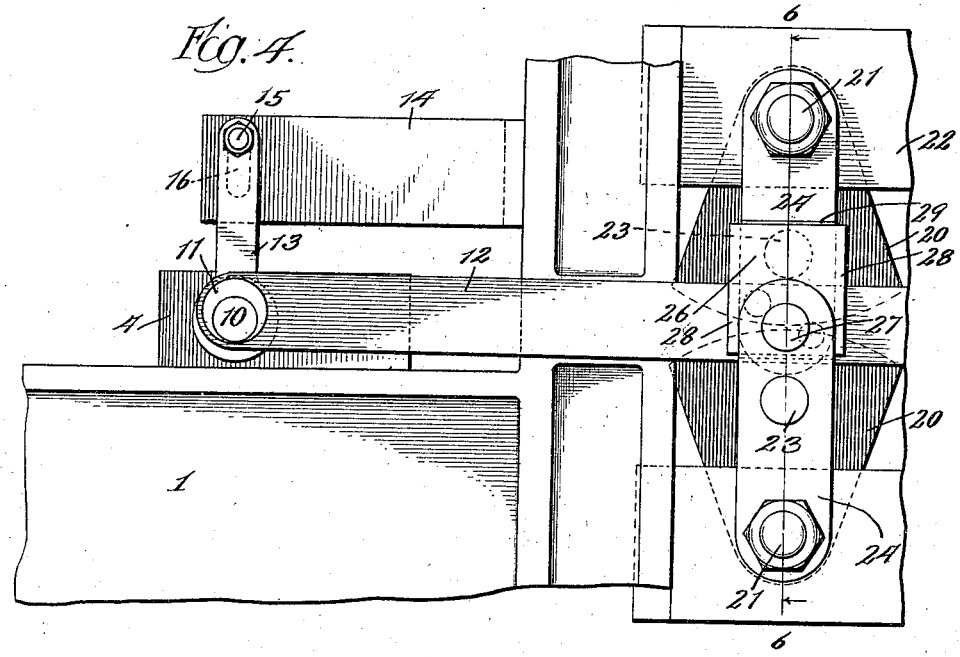
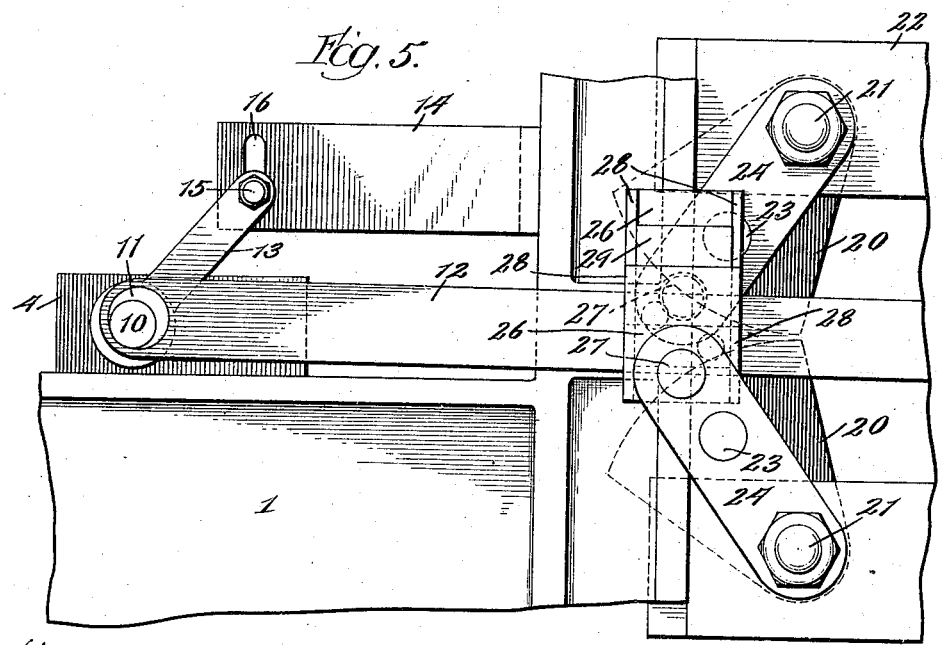

F. ENGEL.
MACHINE FOR FORMING STORAGE BATTERY PLATES.
APPLICATION FILED JUNE 17, 1909.

1,190,990.

Patented July 11, 1916.
5 SHEETS—SHEET 5.

Inventor:
Frank Engel

UNITED STATES PATENT OFFICE.

FRANK ENGEL, OF BUFFALO, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

MACHINE FOR FORMING STORAGE-BATTERY PLATES.

1,190,990. Specification of Letters Patent. Patented July 11, 1916.

Application filed June 17, 1909. Serial No. 502,786.

*To all whom it may concern:*

Be it known that I, FRANK ENGEL, a citizen of the United States, residing at Buffalo, in the county of Erie and State of New York, have invented a certain new and useful Improvement in Machines for Forming Storage-Battery Plates, of which the following is a specification.

My invention relates to machines for forming storage battery plates from lead or other suitable material, and the object of the invention is to obtain a mechanical organization capable of producing a plate having great density, uniformity of configuration, uniform consistency, strength, large contact or working surface, smoothness of surface, and freedom form foreign substances or impurities.

The present machine has many characteristics in common with the machine shown in my prior application, filed November 14, 1907, Serial No. 402,164, but embodies certain improvements, modifications and developments.

The present machine is equipped with a plurality of formers on each side of the blank and is also provided with compensating mechanism for obtaining uniformity of movement between the blank and the working surfaces of the formers.

Figure 1:
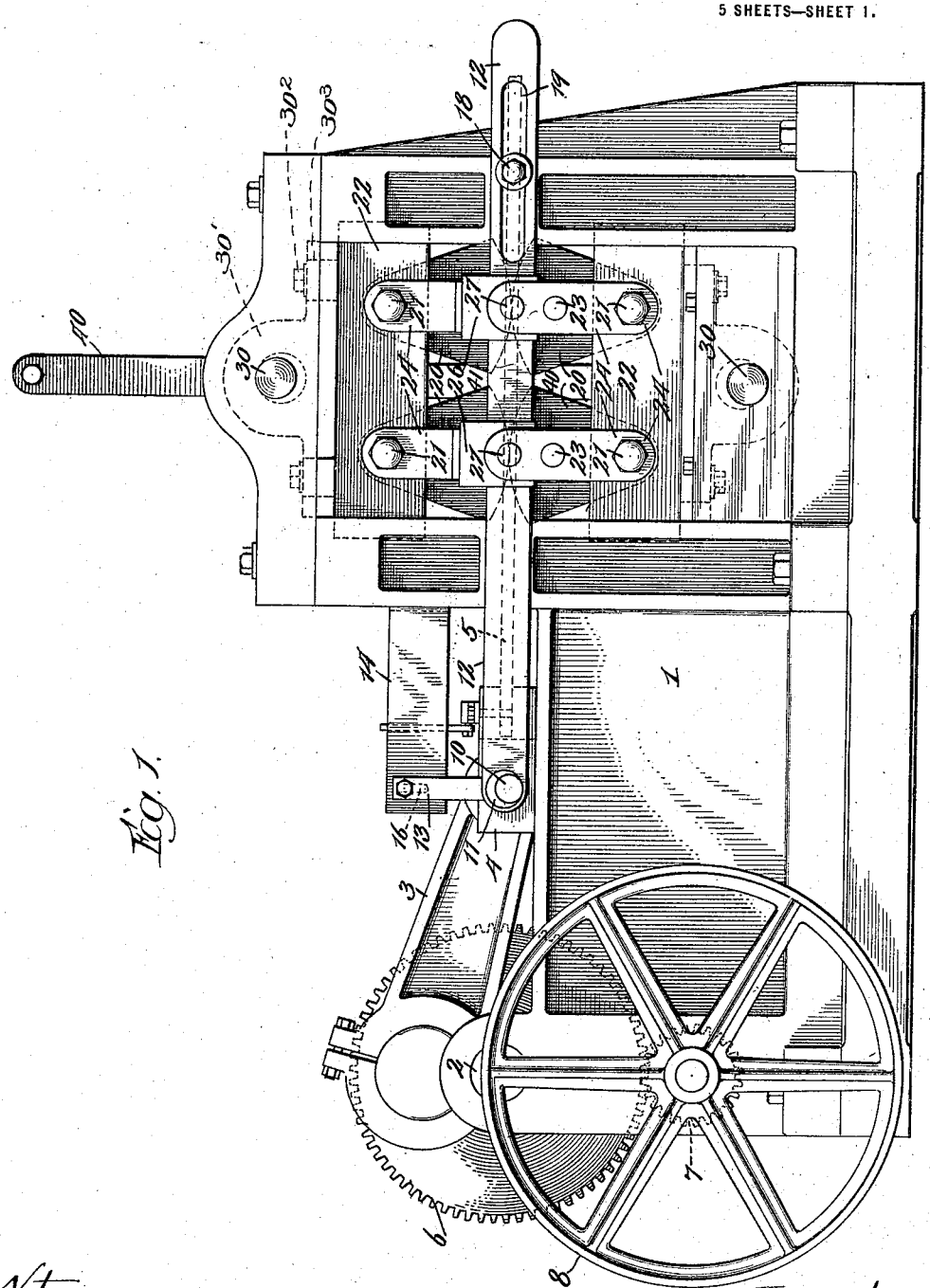
Figure 6:
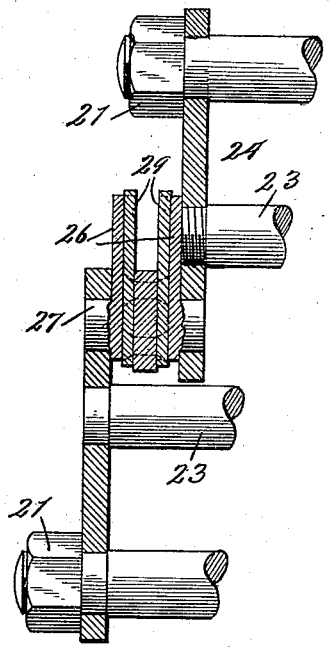
Figure 7:
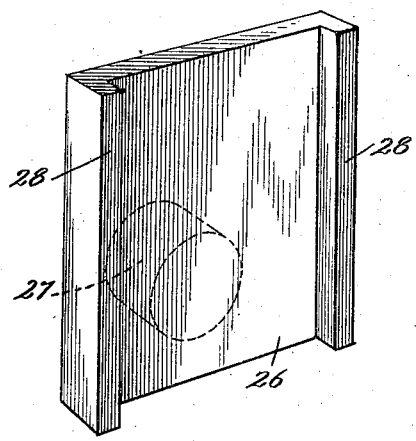
Figure 8:
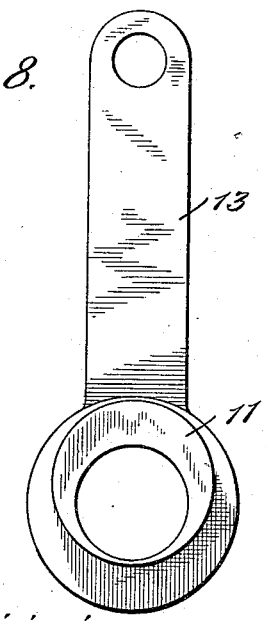
Figure 9:
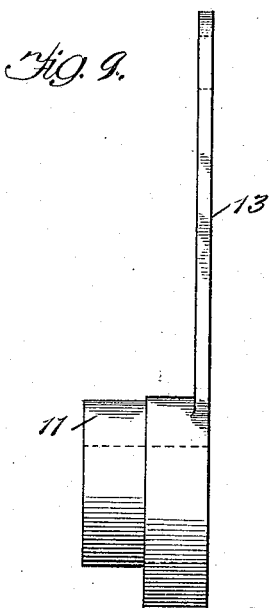

I obtain my objects by the mechanism illustrated in the accompanying drawings, in which:

Figures 1 and 2 are side and plan views respectively. Fig. 3 is an end elevation looking toward the left in Fig. 1. Figs. 4 and 5 are side views showing the compensating mechanism and associated parts in different positions. Fig. 6 is a sectional view taken on the line 6—6 Fig. 4. Fig. 7 is a perspective view of one of the cheek plates of the compensating mechanism. Figs. 8 and 9 are face and edge views respectively of the compensating eccentric.

Similar numerals refer to similar parts throughout the several views.

In the form of machine shown in the drawings, the stationary machine frame 1 supports the crank shaft 2. This in turn operates the pitman 3 which is connected to the cross head 4 which slides on the frame 1 and reciprocates the blank holder 5. This blank holder is a frame work, which reciprocates in a horizontal plane, is actuated by the cross head 4 and carries the lead blank, which is to be acted upon by the formers. The crank shaft 2 may be driven by any suitable means for example, the gear wheels 6 and 7 driven by the band wheel 8.

In the present construction the connection between the cross head 4 and pitman 3 is established through the agency of the cross shaft 10 which projects at the ends beyond the cross head and furnishes a center for the compensating eccentrics 11. The connecting rods 12 which oscillate the formers are apertured to receive the ends of shaft 10, and said eccentrics are oscillated by means of arms 13 apertured to receive shaft 10 and which are pivotally connected at their upper ends to the brackets 14 or other stationary parts of the main frame. Studs 15 rigidly fastened at the extremities of said arms 13 pass through vertical slots 16 in the brackets 14 as best shown in Figs. 1, 4 and 5, and thus afford the necessary freedom of movement of the parts. It is evident that as a result of this construction when the cross head 4 is moved back and forth by the pitman 3 the arms 13 will swing about the studs 15 and thus rotate the cams 11 back and forth through a limited arc around the shaft 10 as a center. This will produce relative movement in a horizontal plane between the rods 12 and the cross head 4 and thus compensate for the difference which would otherwise occur between the travel of the blank and the travel of the periphery of the formers.

The forward extremities of the connecting rods are guided by any suitable means, the present means being the studs 18 which screw into the sides of the main frame and pass through the slots 19 in the connecting rods as shown in Fig. 1.

The formers 20 are in the present instance four in number, two being located above and two beneath the plate holder so as to act upon the blank simultaneously from both top and bottom. The faces of these formers are of such shape as to produce the desired configuration in the finished plate and said formers are pivotally supported upon bolts 21 carried in vertically movable blocks 22.

Said blocks are guided by suitable ways arranged vertically in the main frame on the machine.

In the preferred construction, the formers 20 are composed of a number of blades arranged side by side, these blades being held in proper relation to each other by bolts or pins 23 secured at their ends to side plates 24. Said side plates are, like the former plates, pivoted to the bolts 21. Oscillatory movement is imparted to the formers by the plates 24 which are connected at their free ends to the cheekplates 26 one of which is shown separately in perspective in Fig. 7. Pivotal connection between the side plates 24 and cheek plates 26 is established preferably by studs or bosses 27 formed on said cheek plates and passing through suitable apertures in said side plates. The cheek plates 26 make sliding connection with the connecting rods 12, being, in the preferred construction, provided with flanges 28 which engage the vertical edges of the blocks 29 which are riveted or otherwise rigidly secured to the connecting rods.

The formers are controlled in their movement toward and from the blank by the blocks or cross heads 22 above mentioned and these are moved vertically in their guides by means of the eccentric shafts 30 journaled in the main frame 1. Eccentric caps 30' are carried by the eccentric shafts 30 and are secured to blocks 22 by the bolts 30² which pass through elongated slots 30³ in said eccentric caps, thus permitting the latter to slide on the blocks 22 when the machine is in operation. The construction is such that the rotation of the shafts will cause the raising and lowering of the blocks 22. The motion of said blocks toward each other to cause the formers to work into the blank is normally caused by the worm gears 31 mounted on said shafts and operated by any suitable gearing. In the best construction, the gears 31 are connected to the mechanism which operates the pitman 3 and cross head 4, the advantage being that with such arrangement the parts will always operate in timed relation and an increase in the speed of one of the parts will give a corresponding increase of speed in the other parts. In the particular design shown, the gears 31 are rotated by worms 32 rigidly secured to the upright shaft 33, said shaft being rotated by the worm gear 35 operated by the worm 34 fixed to the shaft 36. Shaft 36 is driven from shaft 2 through the medium of the bevel gears 37 and 38.

It is desirable to provide means for quickly retracting the formers after they have converted the blank into a finished plate and for this purpose I fasten cranks 40 to the eccentric shafts 30 and connect the ends of said cranks to a link 41 operated by a handle 42. It will be evident from the drawing that as the cranks 40 turn, they will move the link 41 in such a path that each position of said link 41 will be substantially parallel with every other position of said link, the link occupying various vertical positions in its cycle of movement. For convenience, the link 41 is referred to as a parallel motion member. The worm gears 31 are connected to the eccentric shafts 30 through roller clutches indicated at 43 Fig. 2. These roller clutches may be of any preferred construction, but should be so arranged that the gears will drive the eccentric shafts 30 in the positive direction only, but will permit the faster or advance rotation of said eccentric shafts in the same direction. This advance rotation may be obtained when the formers are clear of the work by a manual movement of the link 41. Movement of the eccentric shafts 30, whether power or manually driven, will result in reciprocations of the blocks 22.

In operation, the formers are first moved to retracted position, the blank is inserted into the holder 5 and the formers are then moved toward each other by hand until they bear against opposite sides of the blank. The machine is then started up whereupon the gearing will rotate the eccentric shafts 30 so as to bring the formers gradually closer together and force them slowly into the blank. At the same time the pitman 3 causes the reciprocation of the cross head 4, blank holder 5, shaft 10, and connecting rods 12. Owing to the action of the eccentrics 11 the peripheral speed of the formers is made equal to the rectilinear speed of the blank holder and blank, thus producing a true rolling action of the formers on the blank and avoiding any slip or displacement. As a result, the plates are accurately formed and have the other characteristics herein previously mentioned. When the eccentric shafts 30 have moved the formers to their innermost position, the swaging of the battery plates will be complete and further rotation of the shafts 30, which may be accomplished manually, will withdraw the formers. Experience has shown that the steel formers in working on the lead blanks, show practically no signs of wear. However, if, for any reason adjustment is deemed necessary, it is obvious that said adjustment may be obtained by loosening or removing the nuts 30² and placing liners between the blocks 22 and the caps 30'.

It is of course understood that the above embodiment of my invention was selected for the purpose of illustrating one of the many forms which it might assume. I do not desire therefore, to limit myself to the details described and illustrated, but contemplate broadly the inclusion of whatever modifications and changes fall within the scope of the invention as expressed in the appended claims.

I claim as my invention:

1. In a machine of the class described, the combination of an oscillating former, means for supporting a blank in contact with said former, operating means for reciprocating said supporting means, said operating means being connected to said former to oscillate the same, the connection between said operating means and one of said operated elements including a means for varying the character of movement imparted to said element by said operating means, whereby said element may be operated in synchronism with said other operated element.

2. In a machine of the class described, the combination of pivoted oscillating formers, a blank holder for reciprocating the blank in contact with said formers, a common operating means for oscillating said formers and reciprocating said blank holder, the connections between one of said elements and said operating means including an eccentric whereby the speed of operation of said element may be accelerated or retarded.

3. In a machine of the class described, the combination of oscillating formers, a blank holder for reciprocating the blank in contact with said formers, a connecting rod connected to said formers for oscillating them, a shaft for actuating both said connecting rod and said holder, an eccentric mounted on said shaft and journaled in said connecting rod, and means for oscillating said eccentric.

4. In a machine of the class described, the combination of oscillating formers, a blank holder for reciprocating the blank in contact with said formers, a connecting rod connected to said formers for oscillating them, an eccentric journaled in said connecting rod, an arm on said eccentric, said arm being loosely connected to a stationary part of the machine, and a pivot for connecting said eccentric to said blank holder eccentrically.

5. In a machine for forming storage battery plates, the combination with the main frame, of a reciprocating blank holder, oscillating formers adapted to act upon the blank simultaneously from opposite sides thereof, means for causing said formers to move toward the face of the blank, a connecting rod connected to said formers for oscillating them, a cross head imparting motion to said connecting rod and said blank holder, and compensating connections between said connecting rod and said blank holder.

6. In a machine for forming storage battery plates, the combination of an oscillating former, a blank holder, a connecting rod, a member slidably connected to said rod, and pivotally connected to said former for transmitting motion from said rod to said former, driving means for reciprocating the blank and the connecting rod, and means for equalizing the movement of the blank and the periphery of the former.

7. In a machine for forming storage battery plates, the combination of an oscillating former, a blank holder, a connecting rod, a member slidably connected to said rod, and pivotally connected to said former for transmitting motion from said rod to said former, driving means for reciprocating the blank and the connecting rod, and a compensating eccentric adapted to connect said connecting rod to said driving means, said eccentric being loosely connected to a stationary part of the machine for the purpose described.

8. A machine for producing battery plates, comprising a housing and a blank holder supported thereby and adapted to reciprocate, segmental rolls for working a blank in said holder and a reciprocating member, driving said holder and said rolls to move them synchronously the connections between said member and one of said driven elements including a cam whereby the speed of operation of one of said elements may be accelerated or retarded.

9. In a machine of the class described means for holding a metal blank, means for working said blank, driving mechanism for said working means and holding means, adapted to produce substantially the same linear velocity in each, means coöperating with said driving mechanism for forcing said working means against said blank and a parallel motion member operable by a single stroke to quickly withdraw said working means.

10. In a machine of the class described the combination with a frame, of forming means having curved working surfaces pivotally mounted in said frame, a blank holder mounted to reciprocate in said frame, driving means mounted on said frame, comprising a rotating member, driving a cross head by means of a crank, a pivot member carried by said cross head, an arm pivotally mounted on said pivot and carrying a cam, said arm provided at one end with a projection engaging a slot in a part of said frame, a connecting rod communicating motion from said driving means to said forming means, said rod engaging said cam at one end and engaging the formers at the other end by means of a sliding connection, means connecting said cross head and said blank holder, said cam acting to produce substantially the same linear velocities in said blank holder and said curved working surfaces.

11. In a battery plate machine, a segmental former pivotally mounted, a blank holder slidably mounted to support a blank in contact with said former, a reciprocating driving member, straight line connections between said member and said holder and former for rocking said member about its pivotal support and for reciprocating said holder, and compensating means for eliminating the slip between said former and the blank carried in said blank holder.

12. In a battery plate machine, a segmental former pivotally mounted, a blank holder slidably mounted to support a blank in contact with said former, a reciprocating driving member, a member connecting said driving member and said blank holder, a second connection between said driving member and a point on said former, eccentric with respect to the pivotal mounting, and a cam compensating device associated with said second connection.

13. In a battery plate machine, in combination, a housing, a blank holder adapted to reciprocate in said housing, a plurality of segmental formers mounted in said housing on each side of said blank holder, said formers being arranged in opposed pairs adapted to rock against opposite sides of the blank in said blank holder, and a common driving means for said holder and said formers, said driving means including means for accelerating or retarding the speed of one of said driven elements.

14. In a machine for forming battery plates from a blank, formers for simultaneously working opposite sides of the blank, means for reciprocating said formers in contact with the blank, means for advancing said formers toward the blank, and parallel motion means operable by a single stroke to quickly retract said formers from said blank.

15. In a machine of the class described, means for holding a metal blank, means for working said blank, driving means for said working means and holding means adapted to produce substantially the same linear velocity of each, rotating cam means coöperating with said driving mechanism for feeding said working means against said blank, whereby a single rotation of said rotating means will produce a complete cycle of the feeding operation of said working means.

16. In a machine for forming battery plates from a blank, formers for simultaneously working opposite sides of the blank, means for reciprocating said formers in contact with the blank, cam means for advancing and withdrawing said formers, whereby rotation of 360° of said cam means produces a complete cycle of said advancing and withdrawing operation.

17. In a machine for forming battery plates from a blank, formers for simultaneously working opposite sides of the blank, means for reciprocating said formers in contact with the blank, cam means for advancing and withdrawing said formers, whereby rotation of 360° of said cam means produces a complete cycle of said advancing and withdrawing operation, and driving means for said cam means provided with a clutch whereby said cam means may be operated by said driving means or may be operated free ahead of said driving means.

FRANK ENGEL.

Witnesses:
ADOLPH GLAWATZ,
Mrs. W. J. GANVRING.

Copies of this patent may be obtained for five cents each, by addressing the "Commissioner of Patents, Washington, D. C."